March 31, 1936.  F. ROBINSON ET AL  2,035,982
APPARATUS FOR WEIGHING LIVE ANIMALS
Filed July 25, 1935
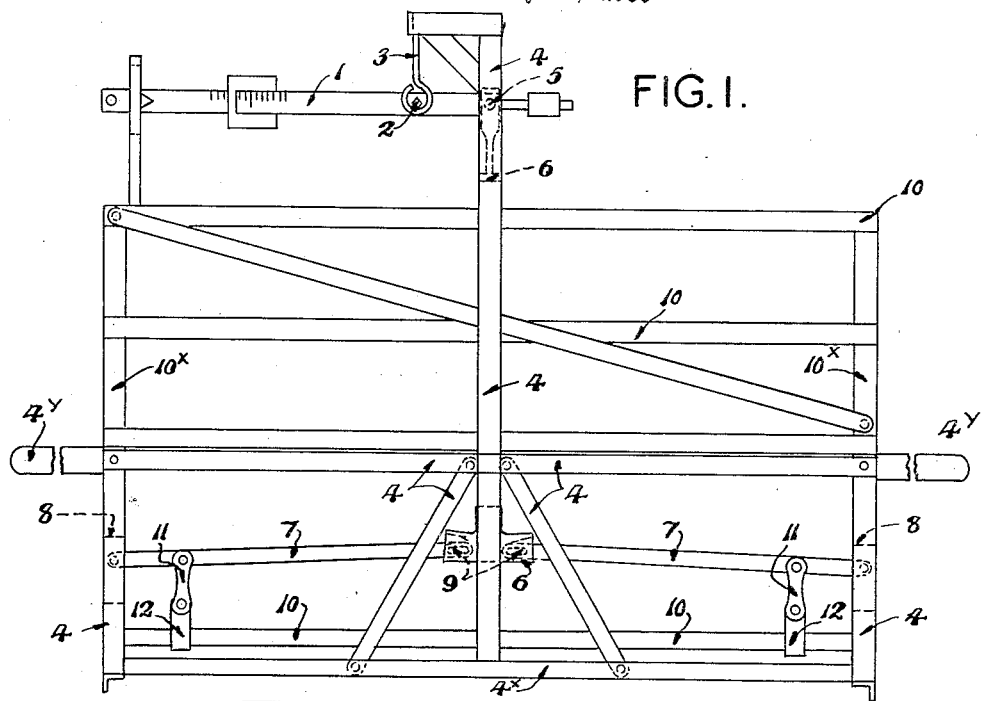
FIG. 1.
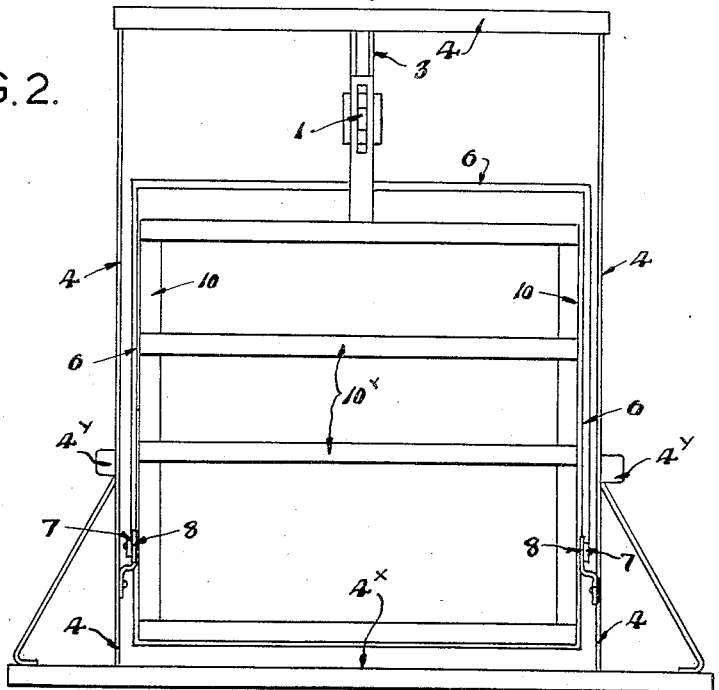
FIG. 2.
FIG. 3.  FIG. 4.
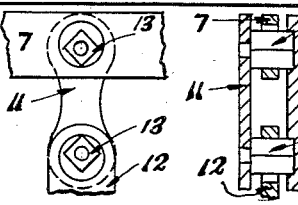

Patented Mar. 31, 1936

2,035,982

UNITED STATES PATENT OFFICE 2,035,982

APPARATUS FOR WEIGHING LIVE ANIMALS

Fred Robinson and Arthur Robinson, Leeds, England

Application July 25, 1935, Serial No. 33,183
In Great Britain July 25, 1934

8 Claims. (Cl. 265—49)

This invention relates to aparatus for weighing live animals, the chief object being the provision of a new or improved apparatus more particularly for use by farmers in weighing pigs prior to sending them to bacon factories or the like.

According to the invention the apparatus comprises essentially a box or crate-like container suspended from a weighing mechanism, said box or crate-like container having at least one door which will enable a pig or other animal to be driven in.

In order that the invention may be clearly understood and readily carried into effect, the same will now be more fully described with reference to and by the aid of the embodiment illustrated in the accompanying drawing; wherein:—

Figures 1 and 2 are a side elevation and an end elevation respectively of the weighing apparatus.

Figures 3 and 4 are detail views showing in elevation and section respectively one of the suspension links and associated bearings for the crate of the apparatus.

Referring to the drawing, the apparatus comprises a weighing beam or steel yard 1 pivotally mounted upon a knife edge bearing 2 in a depending bracket 3 on a fixed frame 4 of the apparatus, and the short arm of the beam or steel yard 1 has pivotally suspended therefrom at 5 a crate supporting frame 6 which may be guided vertically by the fixed frame 4. The frame 6 is connected to the frame 4 by opposed pairs of arms or levers 7 which are pivotally attached to brackets 8 fixed to the ends of the frame 4 and have their inner ends slidably connected to the frame 6 through pin and slot mechanism 9, whilst the crate 10 is suspended by short links 11 attached to floor brackets 12 on the crate, said links being suspended from points on the levers or arms 7 adjacent their outer ends. The links 11 are fitted with rectangular members 13 which engage circular holes in the arms or levers 7 and brackets 12 to afford knife-edge or equivalent suspension bearings. The suspension of the crate by means of short links near the corners in this way limits oscillation of the crate when in use.

The fixed frame 4 comprises an inverted U-shaped structure centrally mounted upon a fixed base $4^x$ with corner posts and longitudinal side rails, and the vertical limbs of the inverted U-shaped frame and the corner or side posts may be adapted to afford vertical guides for the crate-supporting frame 6, whilst the bracket 3 is fixed to the cross-member of said inverted U-shaped frame. Handles $4^y$ are fitted to the ends of the fixed frame 4 so as to enable the apparatus as a whole to be lifted about as desired, whilst the crate 10 is fitted with end doors $10^x$ to enable the pig or other animal to be driven in through one door and then driven out through the other door after weighing, the animal being shut in during the weighing operation.

Instead of employing a weighing beam or steel yard, a spring balance may be used, the crate being directly suspended from the pointer operating member and the casing of the balance being fixed on the cross-member of the fixed frame 4.

It will be seen that the present invention provides a simple, cheap and efficient apparatus for ascertaining the live weight of pigs and other animals.

We claim:—

1. In a weighing device of the class described, a fixed frame, weighing mechanism connected to the fixed frame, a movable frame, means medially connecting the movable frame to the weighing mechanism, longitudinally disposed means connecting the frames whereby to permit actuation of the movable frame relative to the fixed frame, and a crate connected to said last mentioned means so as to be suspended within the frames.

2. In a weighing device of the class described, a fixed frame, weighing mechanism connected to the fixed frame, a movable frame, means medially connecting the movable frame to the weighing mechanism, longitudinally extending bars connected at their outer ends to the fixed frame and slidably connected at their inner ends to medial portions of the movable frame, and a crate having links connected to said bars for suspending the crate within the frames.

3. In a weighing device of the class described, a fixed frame, weighing mechanism connected to the fixed frame, a movable frame, means medially connecting the movable frame to the weighing mechanism, longitudinally extending bars pivotally connected at their outer ends to the fixed frame, means slidably connecting the inner ends of said bars to said movable frame, a crate, short links suspended from said bars and connected to said crate for supporting the latter.

4. In a weighing device of the class described, a fixed frame, weighing mechanism connected to the fixed frame, a movable frame, means medially connecting the movable frame to the weighing mechanism, longitudinally extending bars pivotally connected at their outer ends to the fixed frame, means slidably connecting the inner ends of said bars to said movable frame, a crate, and knife-edged bearing means connecting the crate to said bars.

5. A portable weighing device of the class described, including inner and outer frame members, longitudinally disposed bars connected to the ends of the outer frame and slidably connected to the inner frame member, a crate, and means movably connecting the crate to said bars whereby to limit the oscillatory movement of the crate.

6. A weighing device of the class described, including a fixed frame, a movable frame, longitudinally extending bars connected at their outer ends to the fixed frame, means slidably connecting the inner ends of said bars to the movable frame, and a crate having links adjacent its lower ends and connected to said bars for suspending the crate within the frames.

7. A weighing device of the class described, including a fixed frame, a movable frame, longitudinally extending bars connected at their outer ends to the fixed frame, means slidably connecting the inner ends of said bars to the movable frame, a crate, said crate having short links adjacent its ends, means connecting said links to said bars whereby to limit the oscillatory movement of the crate.

8. A weighing device of the class described, including a fixed frame, a movable frame, longitudinally extending bars connected at their outer ends to the fixed frame, means slidably connecting the inner ends of said bars to the movable frame, a crate, and links having knife-edged bearings connected to the crate and said bars for supporting the crate within the frames.

FRED ROBINSON.
ARTHUR ROBINSON.